United States Patent [19]

Fasolak

[11] Patent Number: 4,579,025
[45] Date of Patent: Apr. 1, 1986

[54] ROTATOR CUTTER MACHINE FOR LARGE PAPER ROLLS

[76] Inventor: Ambrozy J. Fasolak, 124 W. Venango St., Fountainville, Pa. 19140

[21] Appl. No.: 490,297

[22] Filed: May 2, 1983

[51] Int. Cl.[4] ............................................. B23B 5/14
[52] U.S. Cl. ......................................... 82/83; 82/46; 82/101; 83/160; 83/801
[58] Field of Search ...................... 82/83, 101, 46, 47, 82/48, 52, 53; 83/801, 574, 159, 160

[56] References Cited

U.S. PATENT DOCUMENTS

| | | | |
|---|---|---|---|
| 871,828 | 11/1907 | Sexton | 82/101 |
| 1,537,344 | 5/1925 | Giles | 82/101 |
| 2,977,128 | 3/1961 | Judelson | 279/114 |
| 3,017,911 | 1/1962 | Fulghum | 83/159 |
| 3,174,369 | 3/1965 | Denk et al. | 82/101 |
| 3,257,881 | 6/1966 | Davis | 82/101 |
| 3,260,288 | 7/1966 | Currie | 83/801 |
| 3,350,967 | 11/1967 | Gerstein | 82/46 |
| 4,016,785 | 4/1977 | Treffner et al. | 82/53 |

Primary Examiner—Francis S. Husar
Assistant Examiner—Jerry Kearns
Attorney, Agent, or Firm—John F. A. Earley; John F. A. Earley, III

[57] ABSTRACT

A rotator cutter machine for cutting an end off rolls of paper which comprises a chain saw for cutting the paper roll, a vertical travel carriage for supporting the chain saw, a horizontal travel carriage connected to the vertical travel carriage by vertical guide posts, horizontal guide rails for guiding the horizontal carriage movements, a worm mechanism for moving the horizontal travel carriage back and forth horizontally, a vertical drive pulley and chain for moving the chain saw vertically into cutting position and into release position, a power roll and a free riding roll supporting the paper roll and separated by a groove which receives the paper roll, kick out mechanism for kicking the paper roll out of the groove between the power and free riding rolls after the paper roll has been cut, a pair of core end supports each having a swivel ball joint for aligningly supporting the paper roll while being cut, and a stabilizer attached to both ends of the chain saw to stabilize the chain saw as it cuts through the paper roll.

10 Claims, 5 Drawing Figures

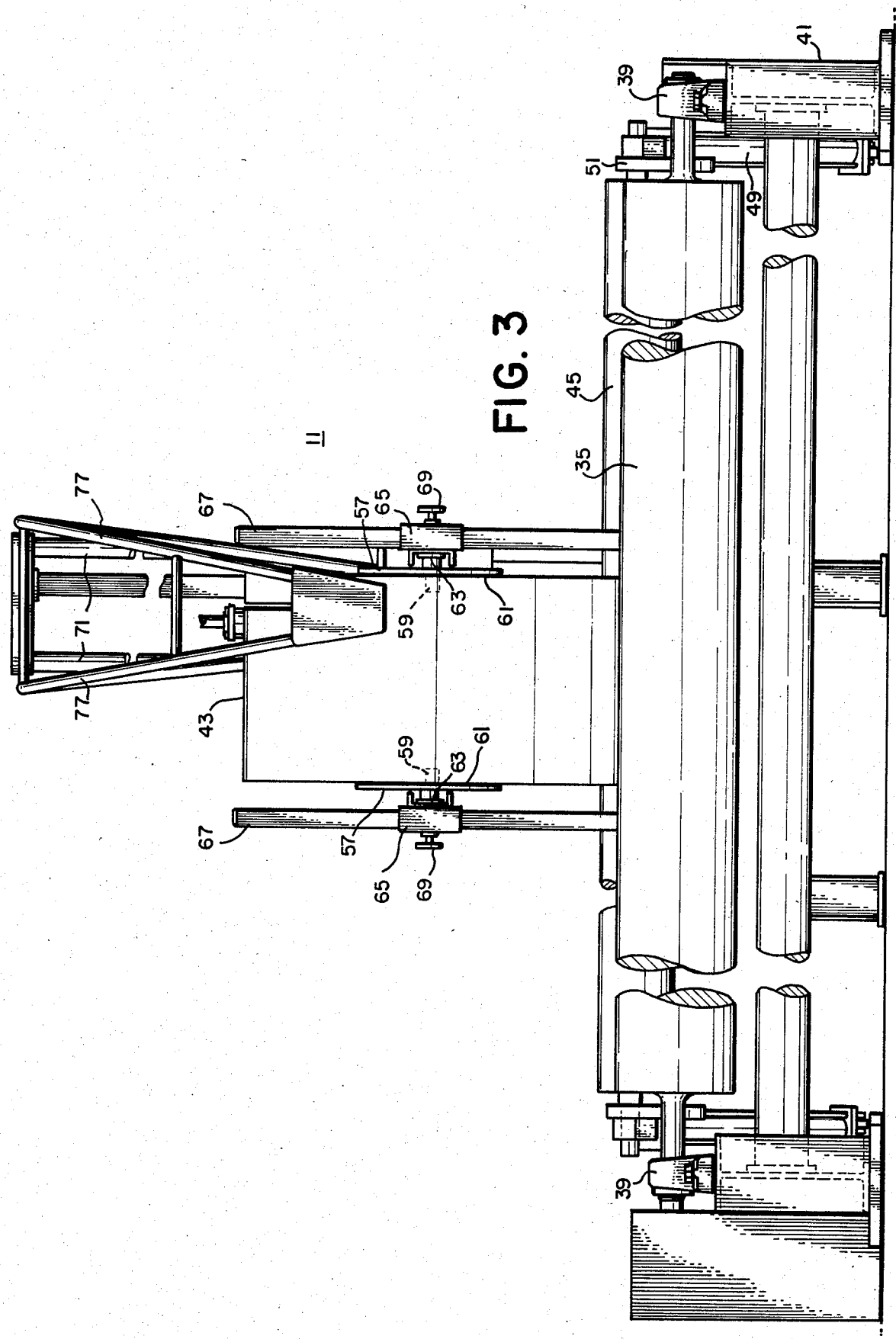

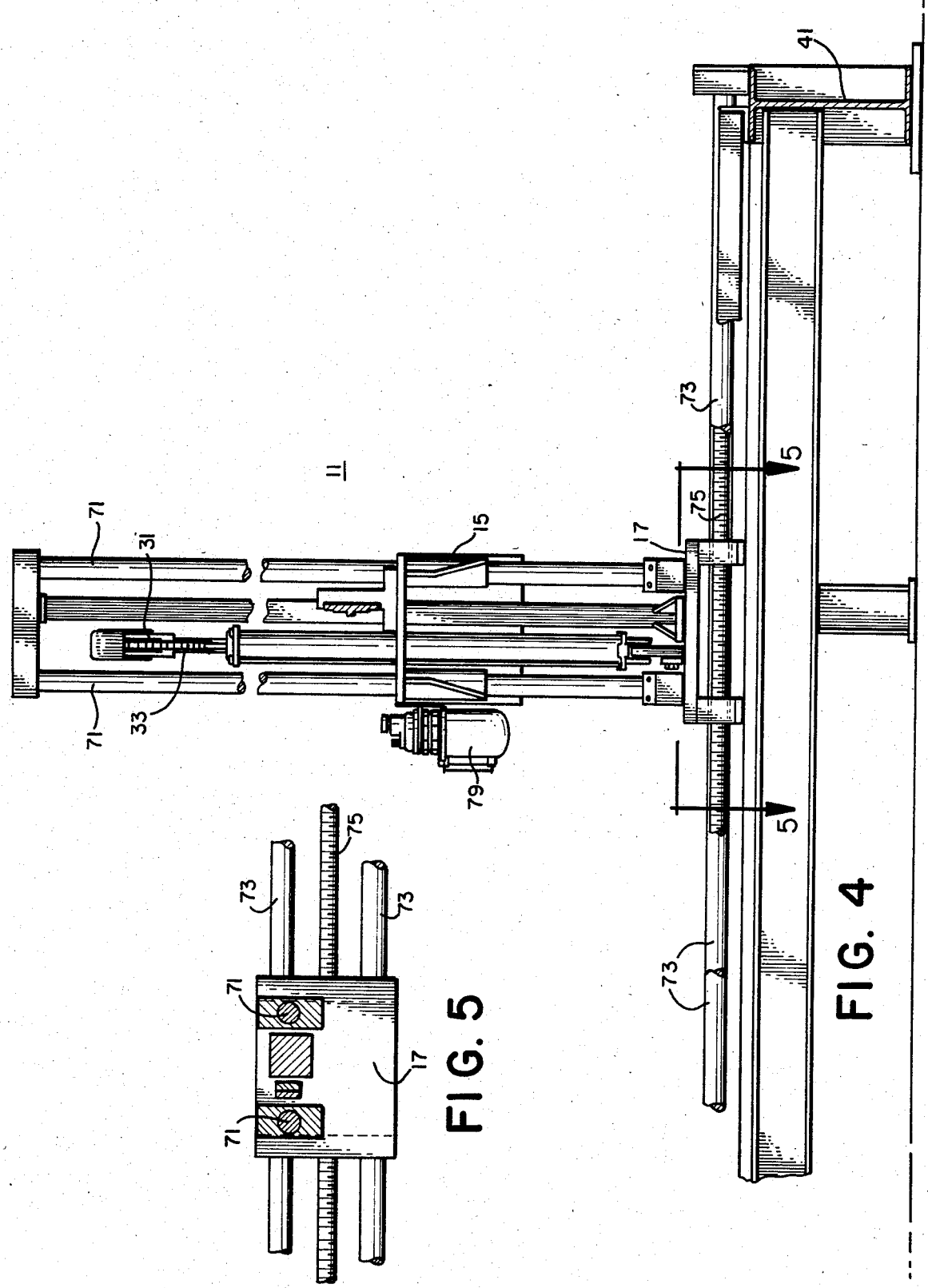

ROTATOR CUTTER MACHINE FOR LARGE PAPER ROLLS

FIELD OF THE INVENTION

This invention relates to the field of processing large rolls of paper such as those used in the printing of newspapers, magazines, and books, and more particularly concerns the removal of damaged ends of those paper rolls so as to salvage the undamaged portion of the rolls.

BACKGROUND OF THE INVENTION

Paper for manufacturing books or newspapers are made in rolls that typically may be 5 to 8 feet long, 60 inches in diameter, weigh 3000 to 8000 pounds, and be worth $300 or more. Sometimes an end of a roll is wet blocked, oversized, crushed or otherwise damaged so as to be useless because the paper cannot unroll properly, for example, in printing newspapers. When this happens, the valuable roll of paper conventionally is thrown away and its value is lost.

For some time it has been desired to salvage at least a part of these damaged rolls. Attempts have been made to cut off the bad end of the roll by using a chain saw held in the hands of a workman, but it is too difficult to hold the saw to get a square cut fresh end. Attempts have also been made to cut off the bad end of a roll by using a band saw, but band saws can break and whip about, and are highly dangerous.

SUMMARY OF THE INVENTION

The present invention solves the problem by providing a machine for cutting large paper rolls with the machine having means for holding the paper roll in squared relationship to a chain saw, that rotates the roll during cutting, cuts a very clean edge, can be easily operated by one man, is self-aligning, and is fast.

This revolutionary approach to cutting rolls that are wet, blocked, damaged or oversized allows one man to easily cut large diameter rolls rapidly.

The inventive machine, with its rugged, economical roll rotator and ejector is speedy and simple, and replaces manual chain saw roll cutting.

The inventive rotator-cutter machine uses a unique chain saw assembly mounted on a rugged roll rotator which provides fast, automatic, and extremely clean-edge roll cutting at a cost comparable to slow and inefficient conventional manual methods.

A single operator can quickly and easily load, cut and unload rolls up to 60 inches in diameter, 120 inch web. The machine is capable of cutting a 45 inch roll in 3 minutes.

The machine is self-aligning and makes cutting simple and accurate.

BRIEF DESCRIPTION OF THE DRAWINGS

FIG. 3 is a front view of the machine of FIG. 1;

FIG. 4 is a rear view of the machine of FIG. 1; and

FIG. 5 is a view in horizontal section taken as indicated by the lines and arrows 5—5 which appear in FIG. 4.

DETAILED DESCRIPTION OF THE INVENTION

Figure 1:
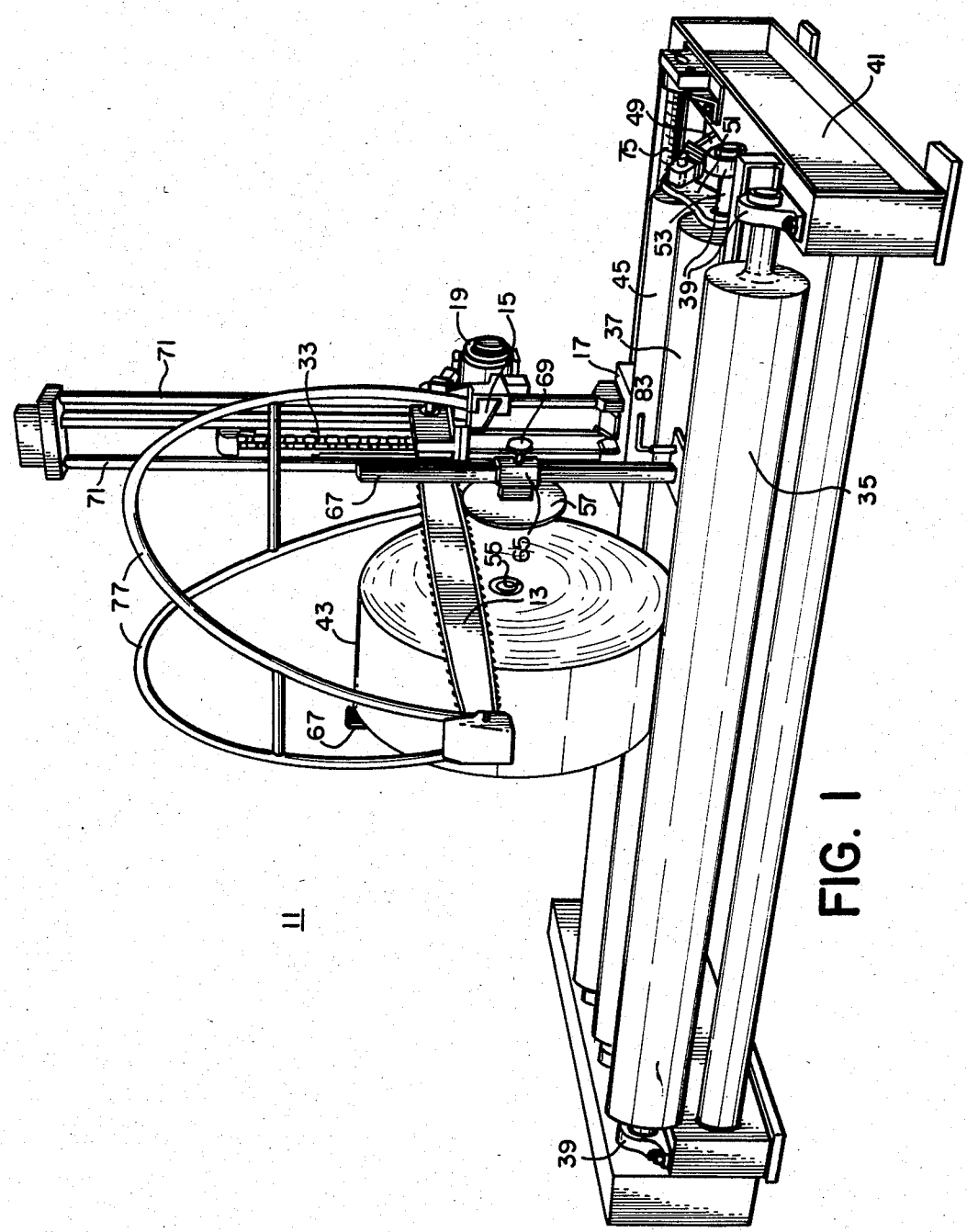
FIG. 1 is a view in perspective of a rotator cutter machine for cutting large paper rolls constructed in accordance with this invention.
Figure 2:
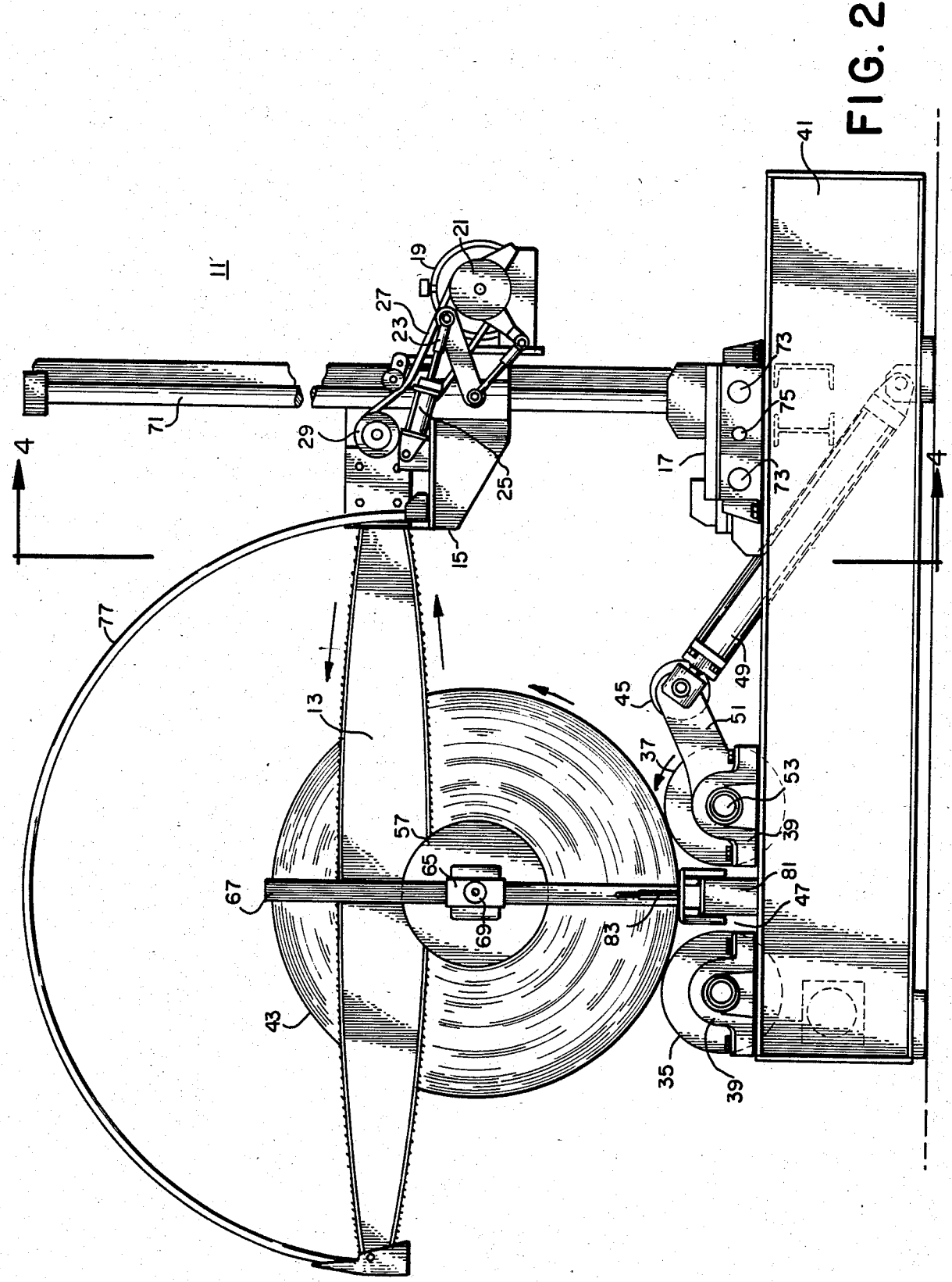
FIG. 2 is a right-side view in elevation of the machine of FIG. 1.

Turning now to the drawings, there is shown a rotator cutter machine 11 for cutting an end off large rolls of paper, which comprises a chain saw 13 for cutting a paper roll, a vertical travel carriage 15 for supporting the chain saw 13 and moving it vertically into and out of cutting position, and a horizontal travel carriage 17 for adjusting the position of the chain saw horizontally and positioning it in a desired position for cutting. The chain saw 13 is driven by an a.c. motor 19 through roto-cam clutch 21, clutch engaging assembly 23, clutch hydraulic cylinder 25, and drive sprocket belt 27 connecting clutch 21 to saw chain drive sprocket 29.

Vertical drive pulley 31 and vertical drive chain 33 are provided for moving chain saw 13 vertically downwardly to cut the roller paper, and for moving chain saw 13 upwardly to release the cut roll.

The paper roll is rotatingly supported by free riding roll 35 and drive roll 37 mounted in pillow block bearings 39 in base frame 41. Drive roll 37 rotates paper roll 43 in a direction counter to the direction of rotation of chain saw 13 for easier cutting of the paper roll.

The paper roll 43, after being cut, is kicked out of the groove 47 between free riding roll 35 and drive roll 37 by a kick out roll 45 which is activated by a hydraulic cylinder 49 with the end of its piston rod connected to the shaft of kick out roll 45. A link 51 is connected between the shaft of kick out roll 45 and the shaft 53 of drive roll 37.

Paper roll 43 has a center core 55. A pair of core end supports 57 are provided and each has a chuck portion 59, a flat plate 61, and a swivel ball joint 63. Chuck portions 59 are inserted into each end of core 55, and the swivel ball joints 63 make core end supports 57 self-aligning. A mounting bracket 65 is provided for core end supports 57, and brackets may be set at any point along vertical guides 67 by set screw 69.

Vertical travel carriage 15 is moved up and down by drive chain 33, and is guided by vertical guide posts 71.

Horizontal travel carriage 17 is adapted to move horizontally and is guided by guide rails 73. Carriage 17 is moved horizontally by a worm mechanism 75.

A stabilizer 77 is attached to both ends of chain saw 13 to stabilize the chain saw as it cuts through paper roll 43. Stabilizer 77 is curved to the shape of paper roll 43 so as to stay clear of the roll as the roll is being cut.

A Norgren micro-fog lubricator 79 is provided for lubricating the teeth and chain of chain saw 13.

In operation, paper roll 43 is rolled over free riding roll 35 into the groove 47 between roll 35 and drive roll 37. The paper roll is measured and the outside of the roll is marked at a point where the cut is to be made, and the blade of chain saw 13 is positioned over that point by adjusting the position of horizontal travel carriage 17. The core supports 57 are inserted into both ends of core 55 and are locked in place on horizontal rail 81 by locking devices 83, and drive roll 37 rotates the roll 43 in a direction counter to the direction of rotation of the chain saw.

Chain saw 13 is lowered by chain 33 and cuts the rotating paper roll until it cuts through core 55. The chain saw 13 is then stopped and the paper roll 43 is released by raising chain saw 13 above paper roll 43. Kick out roll 45 strikes paper roll 43 and kicks it out of the groove 47 and over roll 35 onto the floor where it is picked up and handled by conventional materials handling equipment such as lift-trucks.

A separate motor is used to drive the chain saw 13, the drive roll 37, and the vertical drive chain 33 and kick-out roll 45.

I claim:

1. A rotator cutter machine for cutting an end off a roll of paper, comprising
   a frame supporting a horizontal travel carriage which supports vertical guide posts,
   a chain saw for cutting the paper roll,
   means adjustably mounted on the vertical guide posts for supporting the chain saw,
   horizontally adjustable means mounted on the frame and connected to the horizontal travel carriage for moving the chain saw horizontally to a desired horizontal position for cutting,
   means on the vertical guide posts connected to the chain saw support means for moving the chain saw vertically into cutting position and into release position,
   means operatively connected to the chain saw for driving the chain saw,
   means supported by the frame for supporting and rotating the paper roll while it is being cut,
   means including a pair of core end supports mounted on the frame for holding the paper roll in cutting position while it is cut,
   said means for supporting and rotating the paper roll including a power roll and a free riding roll mounted on the frame for supporting the paper roll and separated by a groove which receives the paper roll, and
   means connected to the power roll for driving the power roll,
   whereby to cut an end off the paper roll with a clean fresh cut that is squared to the axis of the paper roll.

2. The machine of claim 1, including
   kick out means mounted on the frame for kicking the paper roll out of the groove between the power and free riding rolls after the paper roll has been cut,
   said kick out means including a hydraulically operated kick out roll adapted to contact the paper roll and push it out of said groove and over the free riding roll.

3. The machine of claim 1,
   said means for supporting the chain saw including a vertical travel carriage.

4. The machine of claim 1,
   said horizontally adjustable means for moving the chain saw horizontally to a desired horizontal position for cutting including
   horizontal guide rails mounted on the frame for guiding the horizontal carriage movements, and
   worm means for moving the horizontal travel carriage back and forth horizontally.

5. The machine of claim 1,
   said means for moving the chain saw vertically into cutting position and into release position including a vertical drive pulley and chain.

6. The machine of claim 1,
   said means for supporting and rotating the paper roll while it is being cut including
   a power roll and a free riding roll mounted in the frame and supporting the paper roll and separated by a groove which receives the paper roll.

7. The machine of claim 1,
   said means for holding the paper roll in cutting position including
   a pair of core end supports each having a chuck portion that is inserted into each end of the core, a flat plate mounted on the outer end of the chuck portion, and a swivel ball joint extending outwardly from the plate to make the core end supports self-aligning so that the plates lie flat against the paper roll.

8. The machine of claim 1, including
   stabilizer means attached to both ends of the chain saw to stabilize the chain saw as it cuts through the paper roll.

9. The machine of claim 8,
   said stabilizer means being curved to the shape of the paper roll so as to stay clear of the paper roll as it is being cut.

10. A rotator cutter machine for cutting an end off rolls of paper, comprising
    a frame supporting a horizontal travel carriage which supports vertical guide posts,
    a chain saw for cutting the paper roll,
    means including a vertical travel carriage mounted on the vertical guide posts for supporting the chain saw,
    horizontally adjustable means mounted on the frame and connected to the horizontal travel carriage for moving the chain saw horizontally to a desired horizontal position for cutting,
    means on the vertical guide posts connected to the vertical travel carriage for moving the chain saw vertically into cutting position and into release position,
    means operatively connected to the chain saw for driving the chain saw,
    means supported by the frame for supporting and rotating the paper roll while it is being cut,
    means mounted on the frame for holding the paper roll in cutting position while it is being cut,
    said paper roll support means being positioned beneath the chain saw and including a power roll and a free riding roll mounted in the frame for supporting the paper roll and separated by a groove which receives the paper roll,
    kick out means mounted on the frame for kicking the paper roll out of the groove between the power and free riding rolls after the paper roll has been cut,
    said kick out means including a hydraulically operated kick out roll adapted to contact the paper roll and push it out of said groove and over the free riding roll,
    said horizontally adjustable means for moving the chain saw horizontally to a desired horizontal position for cutting including horizontal guide rails mounted on the frame for guiding the horizontal carriage movements, and worm means for moving the horizontal travel carriage back and forth horizontally,
    said means for moving the chain saw vertically into cutting position and into release position including a vertical drive pulley and chain,
    said means for holding the paper roll in cutting position including a pair of core end supports each having a chuck portion that is inserted into an end of the core, a flat plate mounted on the outer end of the chuck portion, and a swivel ball joint extending outwardly from the plate to make the core end supports self-aligning so that the plates lie flat against the paper roll,
and stabilizer means attached to both ends of the chain saw to stabilize the chain saw as it cuts through the paper roll,
said stabilizer means being curved to the shape of the paper roll so as to stay clear of the paper roll as it is being cut,
whereby to cut an end off the paper roll with a clean fresh cut that is squared to the axis of the paper roll.

* * * * *